US009917476B2

United States Patent
Hedberg et al.

(10) Patent No.: US 9,917,476 B2
(45) Date of Patent: Mar. 13, 2018

(54) ADAPTIVE COUPLER FOR REACTIVE NEAR FIELD RFID COMMUNICATION

(71) Applicant: SATO HOLDINGS KABUSHIKI KAISHA, Tokyo (JP)

(72) Inventors: Mats Hedberg, Tokyo (JP); Markus Frank, Stråvalla (SE)

(73) Assignee: SATO HOLDINGS KABUSHIKI KAISHA (JP)

( * ) Notice: Subject to any disclaimer, the term of this patent is extended or adjusted under 35 U.S.C. 154(b) by 443 days.

(21) Appl. No.: 14/402,662

(22) PCT Filed: May 22, 2013

(86) PCT No.: PCT/EP2013/060496
§ 371 (c)(1),
(2) Date: Nov. 20, 2014

(87) PCT Pub. No.: WO2013/174861
PCT Pub. Date: Nov. 28, 2013

(65) Prior Publication Data
US 2015/0130289 A1 May 14, 2015

(30) Foreign Application Priority Data
May 22, 2012 (EP) .................................. 12168855

(51) Int. Cl.
*H04Q 5/22* (2006.01)
*H02J 17/00* (2006.01)
(Continued)

(52) U.S. Cl.
CPC ........ *H02J 17/00* (2013.01); *G06K 19/07786* (2013.01); *H01Q 1/2216* (2013.01);
(Continued)

(58) Field of Classification Search
CPC .......... H01Q 9/065; H01Q 9/28; H01Q 21/29; H04Q 5/22; H02J 17/00
See application file for complete search history.

(56) References Cited

U.S. PATENT DOCUMENTS 5,905,462 A * 5/1999 Hampel .................. H01Q 3/26
333/159
7,348,885 B2 3/2008 Chiu
(Continued)

FOREIGN PATENT DOCUMENTS

EP 1 755 068 A2 2/2007

OTHER PUBLICATIONS

International Search Report dated Oct. 16, 2013 issued in corresponding International patent application No. PCT/EP2013/060496.
(Continued)

*Primary Examiner* — Rexford Barnie
*Assistant Examiner* — Terrence Willoughby
(74) *Attorney, Agent, or Firm* — Ostrolenk Faber LLP

(57) ABSTRACT

An adaptive near field electromagnetic coupler for coupling electromagnetic power to a plane metallic trace (inlay) independently of the inlay geometry and/or orientation without external control algorithms. This is achieved by employing a microstructure of phase altering elements suitable for creating a constant phase field distribution along a top surface of the coupler structure. This is advantageously applicable to printing devices having a function of encoding RFID layers printed on a medium. In view of the provided flexibility, the coupler arrangement can be employed in a variety of printers of different mechanical design.

19 Claims, 4 Drawing Sheets

(51) Int. Cl.
*H01Q 1/22* (2006.01)
*H01Q 21/29* (2006.01)
*H01Q 9/06* (2006.01)
*H01Q 9/28* (2006.01)
*G06K 19/077* (2006.01)
*H01Q 7/00* (2006.01)
*H01Q 21/08* (2006.01)

(52) U.S. Cl.
CPC ............... *H01Q 9/065* (2013.01); *H01Q 9/28* (2013.01); *H01Q 21/29* (2013.01); *H01Q 7/00* (2013.01); *H01Q 21/08* (2013.01)

(56) References Cited

U.S. PATENT DOCUMENTS

| | | | |
|---|---|---|---|
| 7,425,887 B2 * | 9/2008 | Tsirline | H01Q 1/2216 340/572.1 |
| 2009/0184827 A1 | 7/2009 | Petropoulos | |
| 2010/0156573 A1 | 6/2010 | Smith | 333/239 |
| 2010/0277319 A1 * | 11/2010 | Goidas | H01Q 1/2216 340/572.1 |
| 2010/0285746 A1 | 11/2010 | Tsirline et al. | |
| 2011/0090054 A1 | 4/2011 | Frank | |
| 2011/0281535 A1 | 11/2011 | Low | 455/129 |

OTHER PUBLICATIONS

European Office Action, dated Oct. 31, 2017, issued in corresponding European Patent Application No. 13 723 818.4. Total 10 pages.

* cited by examiner

ADAPTIVE COUPLER FOR REACTIVE NEAR FIELD RFID COMMUNICATION

CROSS REFERENCE TO RELATED APPLICATIONS

The present application is a 35 U.S.C. § 371 National Phase conversion of PCT/EP2013/060496, filed May 22, 2013, which claims benefit of European Application No. 12168855.0, filed May 22, 2012, the disclosure of which is incorporated herein by reference. The PCT International Application was published in the English language.

FIELD OF THE INVENTION

The present invention relates to electromagnetic coupling technology. More specifically, the present invention relates to an electromagnetic coupler arrangement suitable for use in a printer for coding RFID inlays or other near field encoding applications.

BACKGROUND ART

Radio frequency identification (RFID) is a technology that uses radio waves to transfer data from electronic tag (known as RFID tags or RFID inlays). The information is stored electronically in the tag. For reading out the information, an RFID reader transmits an encoded radio signal to interrogate the tag. The RFID tag therefore includes an antenna. The same antenna is also used for encoding an RFID tag, by means of electromagnetic coupling. In the simplest case, an antenna is represented by a planar metallic trace into which electromagnetic energy can be coupled.

An RFID device that includes an antenna is usually referred to as an inlay. In particular, an inlay is an RFID device including a flexible metallic antenna film supported on a flexible substrate, which is connected to a transponder. The transponder is an integrated circuit for deciphering signals sent to the inlay and received by the antenna and also for sending a signal to the antenna, which is then transmitted by the antenna. The inlay antenna may be tuned (i.e. sized) to communicate at a certain target frequency with a transceiver, which is sometimes referred to as the interrogator. The interrogator typically includes an antenna for communication with the RFID inlay. An inlay may be active or passive. An active inlay would include its own power source such as a battery, while a passive inlay would receive its power from an external source such as an interrogator.

In recent years, printing devices have become known that enable dislocating an RFID inlay on a medium such as a sheet of paper, and, at the same time, enable encoding the RFID with the desired information, during the printing process. The encoding is performed by means of electromagnetic coupling, preferably in the reactive near field. For this purpose, an RFID printer/encoder is provided with an electromagnetic coupler arrangement that fits in a cavity of the printer so as to couple electromagnetic power bearing the coding information into the RFID inlay which is located on the medium, while the medium is guided into the printer/encoder along a media path.

Conventionally, two types of technologies are used to encode RFID tags (inlays) in reactive near field, which are, in principle, suitable for being fitted into printer cavities:

Static coupler designs employ a rigid electrical RF (radio-frequency) circuit, such as a transmission line circuit on a PCB (printed circuit board). Since the circuit is rigid and inlay geometries generally have very high variability in form factor, the RF coupling behavior between coupler and inlay will also have a high variability. Hence, for each inlay type RF window profiles can be uniquely identified. An exemplary embodiment of a coupler of this type is described in US Patent Application US 2011/0090054 A1. The coupler arrangement described therein splits an input signal having a target wavelength to a first signal and a second signal, and inverts the second signal (i.e. shifts the second signal by 180° in phase by means of half wavelength transmission line). The first and the second signal are fed to two different conductive patches of the coupler arrangement.

Alternatively, adaptive coupler designs with external control (also called semi-adaptive couplers) are known in the art. In this technology, the coupler structure is split up in several "coupling cells" such as an array. Each cell is individually controlled by some external circuit and software. This means that for each type of inlay regardless of its geometry an adaptation can be performed in that only cells for that particular inlay form factor are activated, in order to achieve an optimum coupling. In the ideal case, optimum coupling regardless of inlay form factor can be achieved by having prior knowledge of which cells to activate. In order to get this information about which cells need to be activated, knowledge of the inlay profile is required. Therefore, a scanning process of unknown inlay geometries is necessary. The information obtained by scanning can be stored in a memory so that each inlay type only needs to be scanned once. Nevertheless, for each new inlay type the process has to be repeated. Therefore, an adaptive coupler of said type is not operable as a standalone component but must be accompanied by a software solution containing the necessary algorithms for the scanning process required for external control of the cells to be activated, possibly involving the whole printer system. Examples of this type of couplers are described in U.S. Pat. No. 7,348,885 and US Patent Application No. 2010/0285746.

As can be seen from the above, it is a drawback of both the above described conventional coupler types that calibrations are needed in order to adapt the coupling arrangement to particular inlay to be encoded, before an actual encoding can be performed. Either (static coupler) positioning of the inlay for optimum coupling must be known, or (adaptive coupler with external control) the inlay profile formation must be obtained and stored.

In the static case, each inlay type has its own unique required positioning, which cannot be changed for a fixed coupler. The described static designs would therefore not be suitable for certain applications where a desired position cannot be achieved. Also, a case may occur wherein due to the geometric relations, the coupling performance is too weak to manage any encoding.

In the externally controlled adaptive case, there is a need for a scanning functionality in order to know the inlay profile. Furthermore, if the resolution of the coupling cell array is not small enough, inlay types may still exist which cannot be encoded and the required resolution for any future inlay type may be hard to determine. The adaptive coupler cannot be used in an "empty state" in real time without information on how the cell array needs to be activated for any given inlay type. Furthermore, it cannot be provided as a stand alone component which is separated independently from the system it belongs to, but must be integrated with the software and also hardware periphery. Also, the resolution may still be to coarse to manage all inlay types.

SUMMARY OF THE INVENTION

The present invention aims to provide an improved electromagnetic coupler arrangement that overcomes the above drawbacks and is applicable to couple electromagnetic power into inlays of arbitrary shape efficiently without the need for calibration or external control.

This is achieved by the features of claim 1.

According to a first aspect of the present invention, a multi-layer electromagnetic coupler arrangement for coupling electromagnetic power to a planar metallic trace of arbitrary geometric shape is provided. The electromagnetic coupler arrangement comprises a top surface layer forming the top surface of the electromagnetic coupler arrangement to be arranged closest to a metallic trace to which the electromagnetic power is to be coupled. Further, the arrangement comprises a dielectric layer, a surface of which is covered by the top surface layer as an input signal source layer for providing an AC (alternate current) electromagnetic input field signal. The multi-layer electromagnetic coupler arrangement still further comprises a one- or two-dimensional array of phase altering elements sized and mutually arranged so as to provide for a phase compensation for the spatial change of position between each of the phase altering elements and a neighboring one, thereby transforming the input field signal into a distributed electromagnetic field with a substantially constant phase across the top surface. The one- or two-dimensional array of phase altering elements is provided between the input signal source layer and the dielectric layer.

It is the particular approach of the present invention to provide an electromagnetic coupler arrangement that can be flexibly adapted to coupling electromagnetic power into planar metallic traces such as antennae of an RFID inlay having an arbitrary shape, without a need to be adapted or specifically controlled in advance. Therefore, the coupler arrangement according to the present invention comprises an array of phase altering elements (PAE) arranged so as to provide for a constant phase across a top surface of the arrangement situated close to the metallic trace to be coupled. The coupler arrangement of the present invention is particularly suitable for a printing/encoding device that prints and encodes an RFID inlay guided along a media path, wherein the top surface layer is arranged close to the media path. The present invention further provides a printer/encoder including the electromagnetic coupler.

Preferably, the input signal source layer is arranged so as to provide a guided wave input signal having a target wavelength which is a wavelength of propagation of the signal in a homogenous dielectric material of the type of the dielectric layer. The size of each of the phase altering elements is significantly smaller than one half of the target wavelength. Thereby, the substantially constant phase across the top surface can be achieved in manner that actually extends the phase inversion concept known from static couplers in the art.

According to a preferred embodiment, the top surface layer comprises a metallic material with apertures and/or a microstructure. More preferably, a characteristic size of the microstructure and/or of the dimensions of and distances between the apertures is substantially smaller than the guided wavelength of the electromagnetic field in the dielectric layer. Thereby, the desired effect of microscopic electromagnetic behaviour can be created.

According to a preferred embodiment, the one- or two-dimensional array of phase altering elements comprises a transmission line network (TRL layer). By configuring the transmission line network, a well distributed field acting as a source for the electromagnetic coupling between inlay and top surface.

More preferably, the transmission line network comprises plural transmission line network layers (TRL layers). Further dielectric layers are provided between the transmission line layers on the one hand, and between the input signal source layer and the transmission line layer that is closest thereto. By designing the TRL structure and selecting appropriate TRL and dielectric materials, an optimal coupling regardless of the inlay geometry can be achieved.

According to another preferred embodiment, the one- or two-dimensional array of phase altering elements comprises a metallic layer with apertures. The metallic layer is arranged between the dielectric layer subsequent to the top surface layer and the input signal source layer. According to a further preferred embodiment, the array of phase altering elements may comprise both a transmission line network and a metallic layer with apertures. Further preferably, between the input signal source layer and the metallic layer with apertures, a further dielectric layer is provided.

Also preferably, on the side of the layer structure opposing the top surface, a ground plane layer including a further dielectric and a further metallic layer are provided so as to oppose the phase altering elements side of the input signal source layer. Such a bottom layer enhances the efficiency of creating the desired field distribution carrying a distributed constant phase field along the top surface on the microscopic level.

Preferably, the input signal source layer comprises a strip transmission line. Also preferably, the input signal is a standard guided wave input signal provided by a 50Ω (Ohm) coaxial cable system.

Preferably, each of the phase altering elements includes a network of lumped or distributed components for achieving phase compensation for the predetermined electric length of a respective transmission line segment (TRL segment) included in the coupler arrangement. Thereby, a transmission line segment and a phase altering element together constitute a phase compensated element. Thus, the phase compensated element comprises a TRL segment having a predetermined electrical length and a network of lumped or distributed components for achieving phase compensation for the electrical length of said TRL segment.

More preferably, the components comprise an inductive component and at least one capacitive component, and still more preferably there are two capacitive components and an inductive component. Further preferably, the inductive components are realized as inductive loops, in distributed form. These structures are preferably realized in form of a three layer printed circuit board (PCB). In this case, the intermediate one of the three layers acts as a ground plane. The loops for the inductive component are disposed on one side of the intermediate (central) layer, i.e. an upper or lower layer of the three layer structure. The transmission layer segments are disposed on the opposite side of the intermediate layer, i.e. lower or upper layer of the three-layer structure, respectively. In the three layer PCB-structure, the area of the ground plane may be smaller than the overall PCB-area.

Preferably, the planar metallic trace is part of an RFID inlay (forming an antenna portion thereof), which is encoded by coupling electromagnetic power thereto. Coupling, in particular, reactive near field coupling towards the RFID inlay can be achieved by means of transmission line segments forming phase compensated elements together with the phase altering elements. Alternatively, distributed inductive loops forming a part of the phase altering elements can be employed for reactive near field coupling towards the RFID inlay.

More preferably, the coupler arrangement is employed in a printer, wherein RFID inlays to be encoded are arranged on a medium guided in the printer along a media path. The shape of the multi-layer electromagnetic coupler arrangement preferably can be flexibly adapted so as to achieve a constant distance between the top surface and the media path of the printer at all positions of the top surface.

According to a particular aspect of the present invention, an RFID printer/encoder comprising a multi-layer electromagnetic coupler arrangement according to the first aspect is provided. Preferably, the electromagnetic coupling for transferring coding information to an RFID inlay occurs in the reactive near field. Thereby, the multi-layer electromagnetic coupler arrangement can be easily fitted into a printer cavity, in proximity to the media path.

Further features and advantages of the present invention are set forth in dependent claims.

BRIEF DESCRIPTION OF THE DRAWINGS

Additional features and advantages of the present invention will become apparent from the following and more particular description as illustrated in the accompanying drawings, wherein.

DETAILED DESCRIPTION

The present invention extends and further develops the different concepts of static couplers and semi-adaptive couplers with external control, which have been described above. On the one hand, the present invention utilizes a coupler structure that is split up in several coupling cells, named "unit cells", forming an array. On the other hand, the need for an individual external control of each cell is avoided by employing a particularly designed microstructure. The present invention employs a similar concept of phase shifting as in the conventional static couplers with phase inversion, which is, however, applied on a small scale structure (at least below one half of the target wavelength) so as to compensate for the phase shift occurring between unit cells and providing a substantially constant phase across the top surface. Thus, while according to the present invention, the electromagnetic coupling occurs due to mutual interaction on a unit cell level, nevertheless, arbitrarily shaped inlay structures can be encoded, without the need for an external control by dedicated software and/or hardware.

Figure 1:
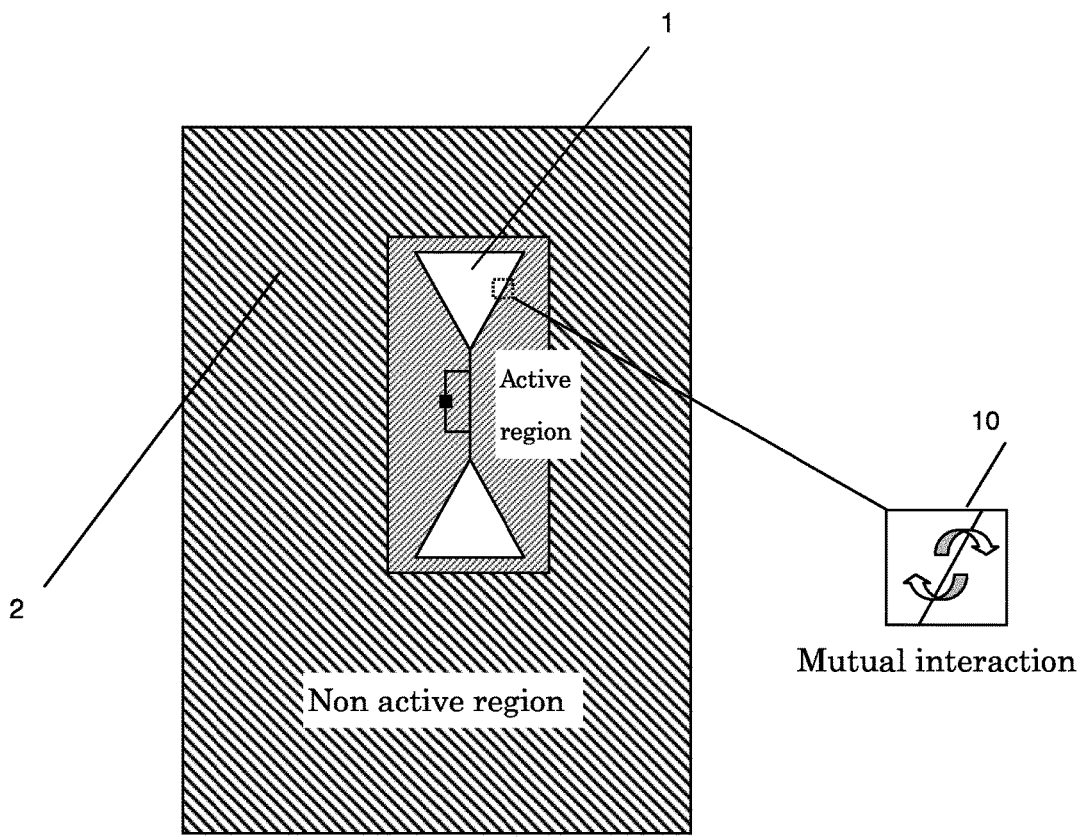
FIG. 1 illustrates an overall structure which facilitates electromagnetic coupling between a multi-layer coupler arrangement and an inlay, by mutual interaction on a unit cell level in accordance with the present invention.

A general illustration of the principles summarized above is given in FIG. 1. FIG. 1 illustrates a top view of planar metallic trace 1 such as an RFID inlay, which is arranged in parallel and in proximity to a microstructure surface (top surface) 2. Since an overall area of the top surface 2 is larger than an area of the planar metallic trace 1, top surface 2 is composed of a non-active region and an active region. The active region corresponds to the portion of the overall area of microstructure surface 2, in which the planar metallic trace is located at the moment of electromagnetic coupling. The distinction of an active and a non-active region reflects the optional feature of the present invention, according to which certain sub regions of the surface can be either activated or deactivated so that isolated encoding of inlays in a neighboring environment can be performed. This can be realized by an external static signal or even in a self regulatory manner.

Coupling is performed by mutual electromagnetic interaction in small area regions of unit cells 10. A single unit cell 10 is highlighted in FIG. 1 for the purpose of illustration.

Top surface 2 is fabricated with suitable material and/or microstructure conforming to the media path of the inlay to be encoded at some distance from the media path (and consequently from the inlay guided along the media path) along the surface normal. For the desired flexibility and coupling efficiency, the whole coupler structure is mechanically flexible so as to be arranged in a manner that if the media path is curved, the top surface is also curved and a constant distance to the media path is maintained at all positions of the top surface 2. The distance may generally be any distance allowed by mechanical tolerance, and an exemplary value is a size order 1 mm to 3 mm (millimeters).

The size order of a microstructure of top surface 2 as described herein (and, at the same time, of the structural elements of lower layers to be described herein below, defining the size of a unit cell for coupling) is given by the guided wavelength of an electromagnetic field (EM field) inside the structure that resides below top surface 2. For instance, if the neighboring layer to the top surface were to be a homogenous medium of dielectric material FR4 with dielectric constant $\in_r = 4.7$, the structural size of the microstructure would be below 77 mm at 900 MHz (Megahertz), which is a half wavelength. Said structure size prevents a zero crossing in phase.

Actually, however, in embodiments of the present invention, the structure of the medium will consist of several parallel layers including the top surface. The layers generally consist of different materials and the boundary of each layer may be of some thin metallic surface with apertures. Furthermore, the structure will have a limited size in both media path direction and cross direction to it. If a mode of EM propagation is supported in such a structure, there is an equivalent effective dielectric constant $\in_{eff}$, which can only be specified with the knowledge of the exact geometry and material dielectric properties. The size of the microstructure (unit cell size) must not be greater than one half of the effective wavelength, $c/(2f \sqrt{\in_{eff}})$, wherein c is the speed of light in vacuum and f is the frequency. Preferably, the size of the microstructure is therefore determined to be much smaller than a half wavelength of the electromagnetic field in a homogenous structure of a dielectric material employed in the multi-layer structure.

In comparison, a typical size parameter of an inlay to be encoded is 100 mm, or 4 inches.

Small structures compared to the wavelength are utilized to create effective microscopic electromagnetic behavior. The unit cell geometry is designed in such a way as to achieve the desired microscopic electromagnetic behaviour of the entire periodic structure. For instance, the structure of the top surface layer can be realised by periodically arranging unit cells of certain two-dimensional patterns which are small compared to the wavelengths. Alternatively, the top surface material may also be of simple material, such as copper. The electromagnetic properties are then given by the structure of this material. Also a top surface 2 that consists partially of a simple homogenous sheet and partially of an adjacent periodic structure Is possible, so that the total extent of the surface is comprised by the periodic structure and the homogenous part.

Although the pattern structure of unit cells (phase altering elements) has been generally described so far as forming a two-dimensional array, the possibility of employing a one-dimensional array structure exists within the framework of the present invention as well. A one-dimensional realization is of particular importance when employing a coupler according to the present invention for RFID encoding in a printer, such as a label and tag printer, wherein the spatial extension of the coupling area may be rather limited.

Top surface layer 2 is adjacent to one phase of a substrate layer of a dielectric material such as ceramic, Teflon, FR4. Also a multi-layer of dielectric materials is possible as said substrate. Said layer contains a distributed electromagnetic field with constant phase across top surface 2. Therefore, this substrate is denoted as the field layer. A crucial portion of the structure according to the present invention is a layer comprising a one- or two-dimensional array of phase altering elements that is provided on the other face of the substrate, opposite the top surface layer 2. The architecture of said layer forms the basis for generating a constant phase EM field contained in the field layer and further develops the phase inversion scheme of the prior art known from US 2011/0090054 A1.

In said prior art, a transmission line circuit consisting of two quarter wavelengths micro strip lines each fed with one half in power of a split signal where one is 180 degrees phase shifted relative to the other is provided so that the current consequently flows in one direction at every time instant. The orientation of the lines is such that strong coupling is achieved in one linear direction. The lines which are shorter than one half of the guided wavelength with phase shifted versions of a signal can be regarded as phase altering elements. In accordance with the present invention, the idea of phase altering elements known from co-assigned US 2011/0090054 A2 is extended as follows: Firstly, the size of each single element is reduced to the above described unit cell size such that each element consequently alters the phase by a smaller amount. Secondly, by employing the higher spatial degree of freedom as a consequence of the size reduction, a one- or two-dimensional array of phase altering elements distributed over the layer area is created, thereby considerably increasing the number of elements as compared to the prior art (having only two phase altering elements). Said array results in a constant phase field since from each element to a neighboring one a phase compensation for the spatial change of position occurs keeping the phase constant. Due to the described configuration, the unit cells are independent of each other. The sum of contributions from all unit cells yields the desired macroscopic behavior when the inlay is present. Then, the microstructure and inlay together form a system of energy transfer.

It is well known that the time alternating magnetic field induces a current on a metal object (principle of electromagnetic induction). Thus, a metal trace located above, close and parallel to the top surface experiences such an induction, when the top surface has such properties as to let an EM field in the field layer penetrate it. Since the phase is constant along any direction within the top surface, the metal trace may be oriented arbitrarily as long as it is still parallel and within the dimensions of the top surface. A further consequence of small elements, provided the spatial resolution is high enough, is that the metal trace can have virtually any shape.

The array of phase altering elements can be realized in different ways. Two particular embodiments will be described below, by way of example. A person skilled in the art is aware of plural possible modifications and combinations of elements of the described particular exemplary embodiments.

A first embodiment corresponds to the so-called stripline technology, wherein a metallic stripline forming a transmission line layer is sandwiched between two metallic ground plane layers. The stripline and the ground plane layers are isolated from each other by means of dielectric substrate layers.

For example, the opposite face of the dielectric substrate (field layer) is a ground layer (ground plate) with apertures. In subsequent order, an additional layer or multilayer of substrate of a suitable material such as ceramic, teflon, FR4 is provided. The bottom side of the additional substrate constitutes a transmission line network in stripline technology. An additional layer or multilayer of substrate is added with a metallic ground plane as the bottom layer of the entire structure.

A second embodiment corresponds to the so-called microstrip technology. In microstrip technology, only on one side of the transmission line layer a ground plane is provided. The field layer also acts as a ground plane for the transmission line network.

In an example of the second embodiment, the substrate for the top surface 2 and the transmission line network is the same. An additional layer or multilayer substrate is added with a ground plane as the bottom layer of the entire structure.

In both cases, the architecture of the transmission line network is fundamental for the generation of constant phase EM field contained in the field layer.

The operation of the multi-layer electromagnetic coupler according to the present invention will be briefly discussed below. As described above, at any position on the top surface layer the distance to the media path, i.e. to the guided metallic trace of an inlay to be encoded is held constant. When an inlay regardless of geometry is present within the region of the surface, a mode of reactive near field coupling is created between the inlay and the top surface so that part of the energy in the signal fed to the TRL layer having the one- or two-dimensional area of phase altering elements will be transferred to the transponder of the inlay. This means that prior to the presence of the inlay the coupling mode does not exist since the inlay itself acts as a fundamental component of the coupling. The principle of coupling is independent of inlay geometry since the interaction between the inlay and the top surface is at microstructure level and also determined by the material and structure of the surface itself, i.e. rather exhibited by the surface area of a unit cell then by considering the whole extent of the inlay. However, the particular geometric arrangement of the coupler structure may have a considerable influence on the coupling.

The layer structure of the multi-layer electromagnetic coupler arrangement according to the present invention will be further detailed with reference to FIG. 2. FIG. 2A shows by way of example the sequence of layers including the inlay (not forming a part of the electromagnetic coupler structure according to the present invention) and plural layers of the electromagnetic coupler arrangement according to a particular embodiment of the present invention. The top row shows a plane of metallic trace 1 such as a RFID inlay (also shown in FIG. 1). The second and third rows of FIG. 2A show the layers of an exemplary embodiment of the invention that follow from the top surface, in the order of increasing reference numerals. The sequence starts with the top surface layer 2 that is to be placed adjacent inlay 1. Through the top surface of layer 2 a static field is coupled to the inlay 1 so that effectively a form of a parallel plate capacitor with the inlay being one of the plates is created. Between layers 2 to 7 of FIG. 2A, dielectric substrates of suitable materials are placed, as described above. Those intermediate dielectric substrates are not shown in the figure. Subsequently following layers 3 and 4 of FIG. 2A are transmission line layers (TRL) forming a transmission line network. Although in the present exemplary drawing two strip transmission line layers having a different spatial orientation of the strips are shown, the present invention is not limited in such a situation. A transmission line network may be formed by a single one or plural transmission line layers. The purpose of transmission line layers 3 and 4 is to create a distributed field with minimum phase difference across the entire surface area. The strips on layers 3 and 4 may be resonant and/or of different lengths, terminations and phase altering components along the way, all together configured in such a way as to create the distributed field. This can be achieved by a distributed network of planar transmission line segments with different geometries with possible addition of discrete lumped elements. By performing the components sufficiently small (at least smaller than the half target wavelength), a high enough resolution is achieved so that effectively on the microscopic level a distributed constant phase field is achieved along the surface. Subsequent layer 5 forms a ground plane layer having apertures. The apertures in ground plane layer 5 also may be arranged in an array, so as to form a two-dimensional array of phase altering elements. It follows strip transmission line layer 6 which is provided between ground plane layer 5 and an additional ground plane layer 7. Strip transmission line layer 6 serves as an input signal source layer and may be realized by being coupled in microstrip or stripline technology with a standard 50Ω coaxial cable system. The illustrated arrangement of input signal source layer 6 between two ground plane layers 5 and 7 of which one layer 5 has apertures which serves for coupling electromagnetic RF (radio frequency) energy towards TRL layers 3 and 4 corresponds to stripline technology.

The TRL layers are configured so as to create a well distributed field acting as a source for the electromagnetic propagation between inlay and top surface. Furthermore, on the unit cell level the top layer is configured so that when an inlay is present mutual interaction provides for energy transfer between TRL layers and the inlay in the microscopic sense. Since the transponder sensitivity is very high, the TRL layer can be configured in such a way that good input impedance match towards the signal source is assured. In other words, the high sensitivity of the inlay transponder can be utilized to create a TRL layer having good input match regardless of inlay geometry so that the coupling between inlay and TRL layers will be independent of shape and size of the inlay. The efficient coupling is assured by the microstructure which is designed for coupling on unit cell level.

Figure 2B:
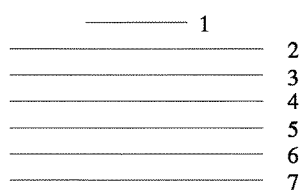
FIG. 2B illustrates a sequence of the layer structure in a side view.
Figure 2A:
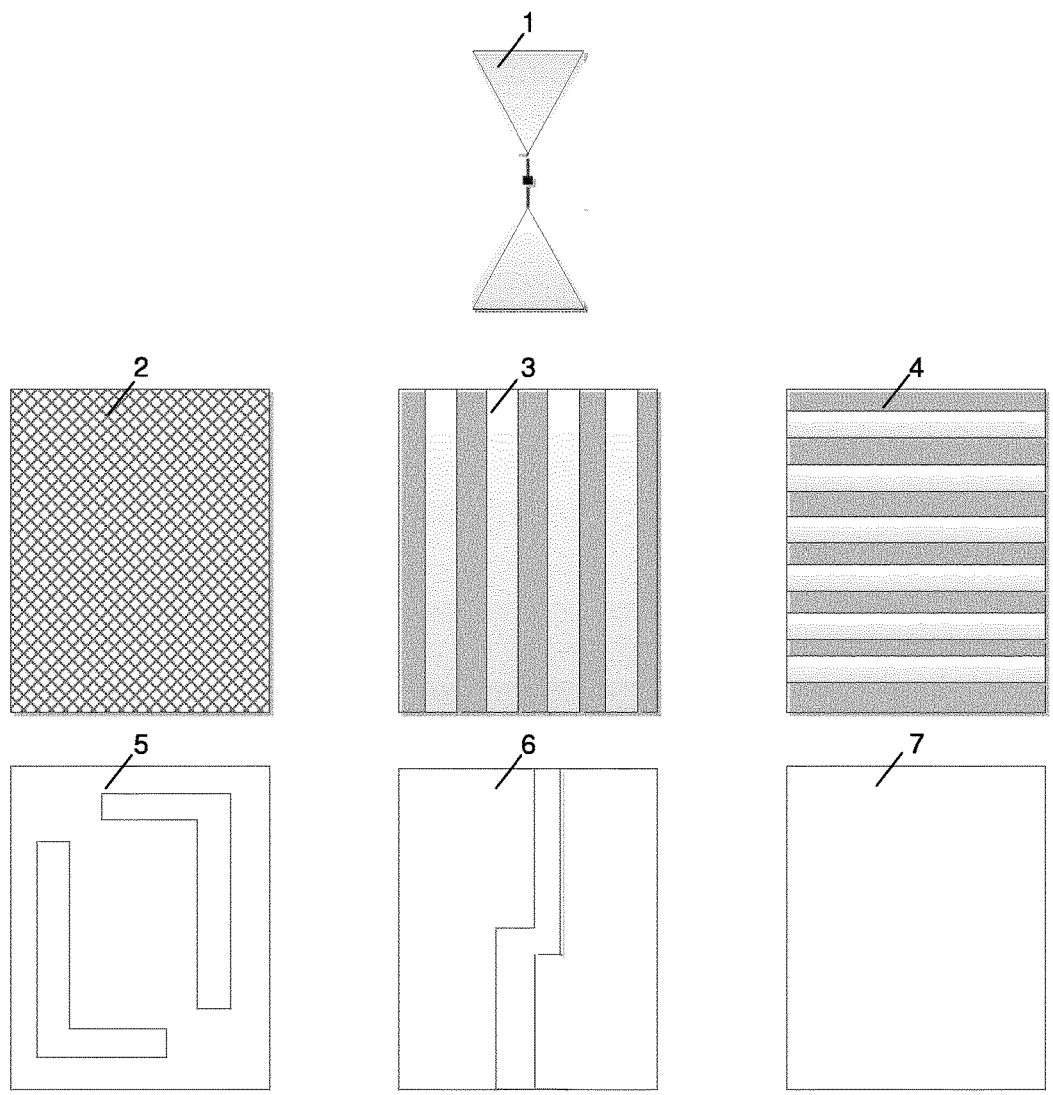
FIG. 2A illustrates different layers forming the multi-layer electromagnetic coupler arrangement together with an inlay to be encoded, according to an embodiment of the present invention.

FIG. 2B shows a side view of the layer structure. As can be seen from the drawing, and in compliance with FIG. 1, inlay 1 does not cover the whole area of the layers of the electromagnetic coupler structure. As described above, substrate material of suitable type (not shown) resides between all layers of the structure from 2 to 7.

It is further noted that the above described sequence of layers has been given by way of example only. Further embodiments for certain layers may be modified or omitted, or additional layers may be provided. For instance, instead of two transmission line layers 3 and 4, a single transmission line layer may be provided. A further example, corresponding to the above-described "embodiment 1" corresponds to the electromagnetic coupler arrangement comprising only layers 2, 5, 6 and 7, with the respective dielectric substrate layers (not shown), wherein in layer 5 a two-dimensional array of phase altering elements in form of apertures is provided.

In the following, with reference to FIGS. 3 to 5, an explanation will be given for the particular realization of a phase altering element for being employed in an electromagnetic coupler arrangement, in particular, an RFID reactive near field coupler, according to an embodiment of the present invention. For the sake of simplicity, the explanation below will generally be given for a one-dimensional array. Although as indicated above, a one-dimensional array may be of practical relevance, in particular for applications where only limited space is available, an extension to the two-dimensional case is applicable.

In the embodiment, a phase altering element and an adjacent transmission line segment (TRL segment) together form a phase compensating element. A general circuit representation of the exemplary phase compensating element is shown in FIG. 3.

Figure 3:
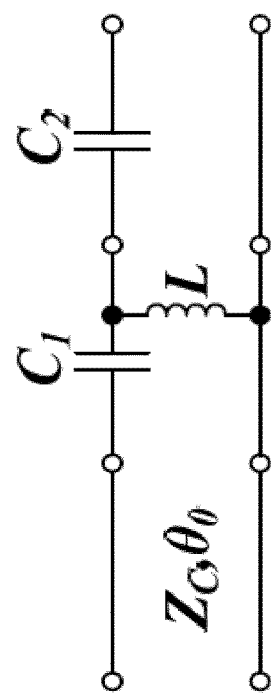
FIG. 3 illustrates a general circuit representation of a phase compensating element employed in accordance with an embodiment of the present invention.

On the left hand side of FIG. 3, a transmission line segment (TRL segment) is shown. The TRL segment is characterized by its characteristic values $Z_C$ and $\theta_0$ corresponding to an electrical length of the TRL segment. $Z_C$ is the characteristic impedance of the TRL segment and $\theta_0$ is the phase angle change corresponding to the centre frequency of the applied electric signal.

On the right hand side of FIG. 3, an arrangement of two capacitors $C_1$ and $C_2$ together with an inductor L is schematically shown. For the circuit shown in FIG. 3, it can be mathematically shown that if the component values are chosen according to $$L = \frac{Z_C}{\omega_0 \sin\theta_0}, \qquad (1)$$

$$C_1 = C_2 = \frac{\sin\theta_0}{\omega_0 Z_C (1 - \cos\theta_0)},$$

phase compensation and input match can be simultaneously achieved. Phase compensation means that the LC circuit on the right hand side of FIG. 3 provides for phase compensation for the phase change in view of the electrical length of the TRL segment on the left hand side of FIG. 3. Generally speaking, the TRL segment therefore corresponds to the spatial position difference (spatial change of position) between two adjacent phase altering elements, and the LC circuitry on the right hand side of FIG. 3 corresponds to a phase altering element providing for a phase compensation for the spatial change.

Input match means to avoid a reflection of an HF (high frequency)-input signal in the coupler structure to a high degree, so as to achieve good coupling efficiency in that a large portion of the input energy can be put through.

In formula (1) above, θ and ω are respectively the phase angle of the TRL segment and the frequency, where the subscript 0 denotes the center frequency and corresponding phase angle of the applied electric signal. The given representation is very general and can be the one-dimensional equivalent of any coupling structure used for reactive near filed coupling towards RFID inlays. In view of the above, it can be said that FIG. 3 illustrates a phase compensating element which is comprised of a TRL segment and a phase altering element.

An electromagnetic coupler arrangement according to the present invention includes several circuit portions such as those shown in FIG. 3. In principle, any of the components shown in FIG. 3 can be used as a coupling component. Preferably, either the TRL segment ($Z_C$, $\theta_0$), or the inductive component L is used as a coupling component. If the TRL segment is the coupling element, L and $C_{1,2}$ may be discrete or distributed components that are used for phase compensation only. $C_2$ may be disregarded in the case of short segments for which the short segment approximation is valid. $C_2$ becomes more important for longer segments (so that the short segment approximation is no longer valid, but still shorter than corresponding to a phase shift of π/2)

Alternatively, the inductive component L is used as the coupling element. According to a preferred embodiment, the inductive component L is realized in distributed form as a loop. The phase compensation is also valid for the current through L, and therefore a loop is suitable for magnetic reactive near field coupling towards RFID inlays.

Figure 4:
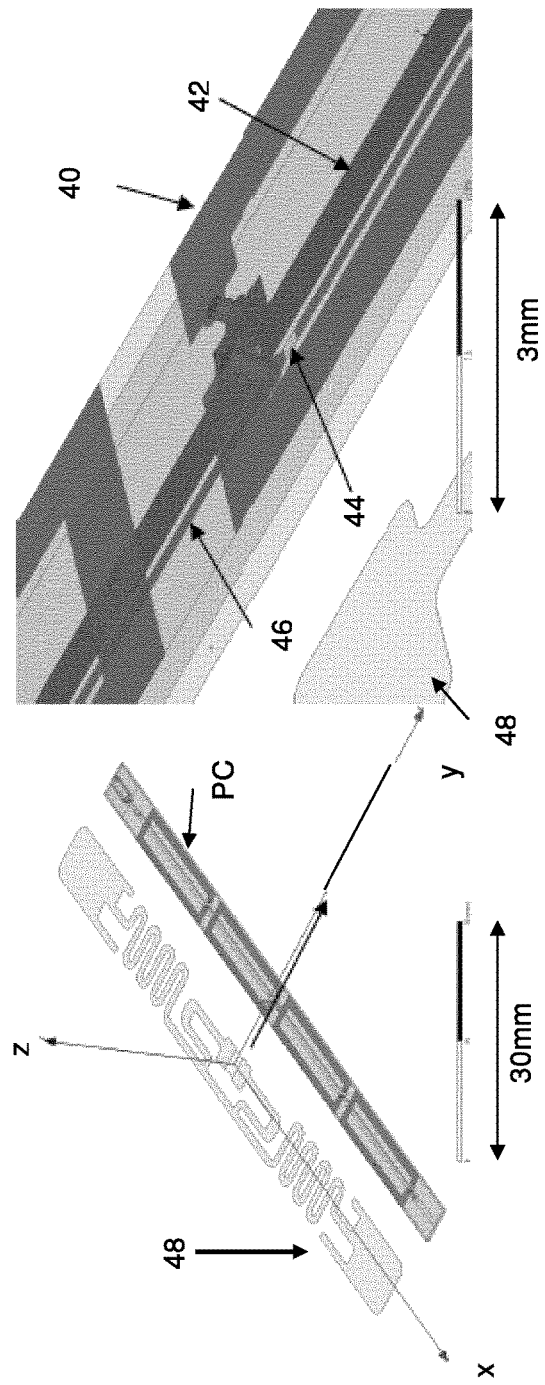
FIG. 4 illustrates an example for realizing a phase compensated element including an inductive loop coupler portion employed in an electromagnetic coupler arrangement according to an embodiment of the present invention.

FIG. 4 shows a possible realization of a structure wherein the inductive component L is realized in distributed form as a loop so as to be employed for coupling.

The left hand side of FIG. 4 shows an inlay 48 together with the direction of motion thereof, indicated by an arrow parallel to the y-axis of the coordinate system, and a one-dimensional array structure having four phase compensated elements PC.

An enlarged view of a detail of the left hand side picture is shown on the right hand side picture of FIG. 4. The particular values of the scale lengths, 30 mm and 3 mm (millimeters) are given by way of example only, and a skilled person is aware that the invention is not limited to those particular values.

FIG. 4 shows the TRL segments 46 along with lumped capacitors 44 disposed on one side of a PCB structure and a distributed realization of inductors 40 disposed on the opposite side. The inductors 40 act both as phase compensation components as well as coupling elements.

More specifically, the right hand side of FIG. 4 illustrates a three-layer PCB structure (wherein the layers are arranged one over the other in the direction corresponding to the z-axis on the left hand side drawing). Inductive loops 40 are distributed on one side and TRL segments 46 and capacitors 44 are distributed on the opposite side of a ground layer 42 arranged in between. The networks on different layers are connected through vias.

It is possible to open up the ground plane 42 so that it partially only acts for the TRL segments 46, whereas the inductive loops 40 are partially open loops apart from grounded TRL segments 46. As can be seen in the figure, the ground plane 42 does not necessarily cover the complete width of the PCB, but the geometric form thereof may be varied so as to achieve an optimal coupling strength. It has to be noted that both an open loop and a TRL of a certain length which are grounded act as distributed inductors.

Functioning as coupler, the structure shown in FIG. 4 represents a particular realization of TRL layers 3 and 4 shown in FIG. 2A.

In case the cascaded configuration shown on the left hand side of FIG. 4 has optimized parameters in correspondence with formula (1) above, such a configuration has a transfer close to unity which means that a perfect match and current transfer is achieved independently of the input and output impedance at the center frequency of the applied HF electric input. Therefore, suitable component values for input and output networks in order to determine a suitable current magnitude in the loops can be chosen independently without affecting the internal phase compensating properties of the line.

More specifically, the current magnitude ratio between the inductor current $I_L$ and input current $I_{in}$ in case the phase compensated element is inserted in a system having an input impedance $Z_0$ is given as $$\left|\frac{I_L}{I_{in}}\right| = \sqrt{(1-\cos\theta_0)^2 + \frac{Z_0}{Z_C}\sin^2\theta_0} \,. \tag{2}$$

The general property of the phase compensated element as described above is the unit transfer of voltage and current from input to output at the center frequency. This means that the input match is entirely determined by the load regardless of the impedance level $Z_C$ of the TRL segment. The reference system impedance $Z_0$ (for instance, 50Ω) will be the characteristic impedance of the external system TRL interface which is connected to the input of the coupler. In case of a load impedance connected at the output of the phase compensated element which is equal to the system reference impedance, perfect match is achieved at the input of the phase compensated element. This is however only at the center frequency. Since the properties of the phase compensated element are frequency dependent load impedance values deviating from the system reference impedance may be valid in order to fulfil certain bandwidth requirements, when the impedance level $Z_C$ of the phase compensated element is fixed to fulfil desired coupling characteristics. Then in general a matching circuit at the input of the coupler is needed.

Figure 5:
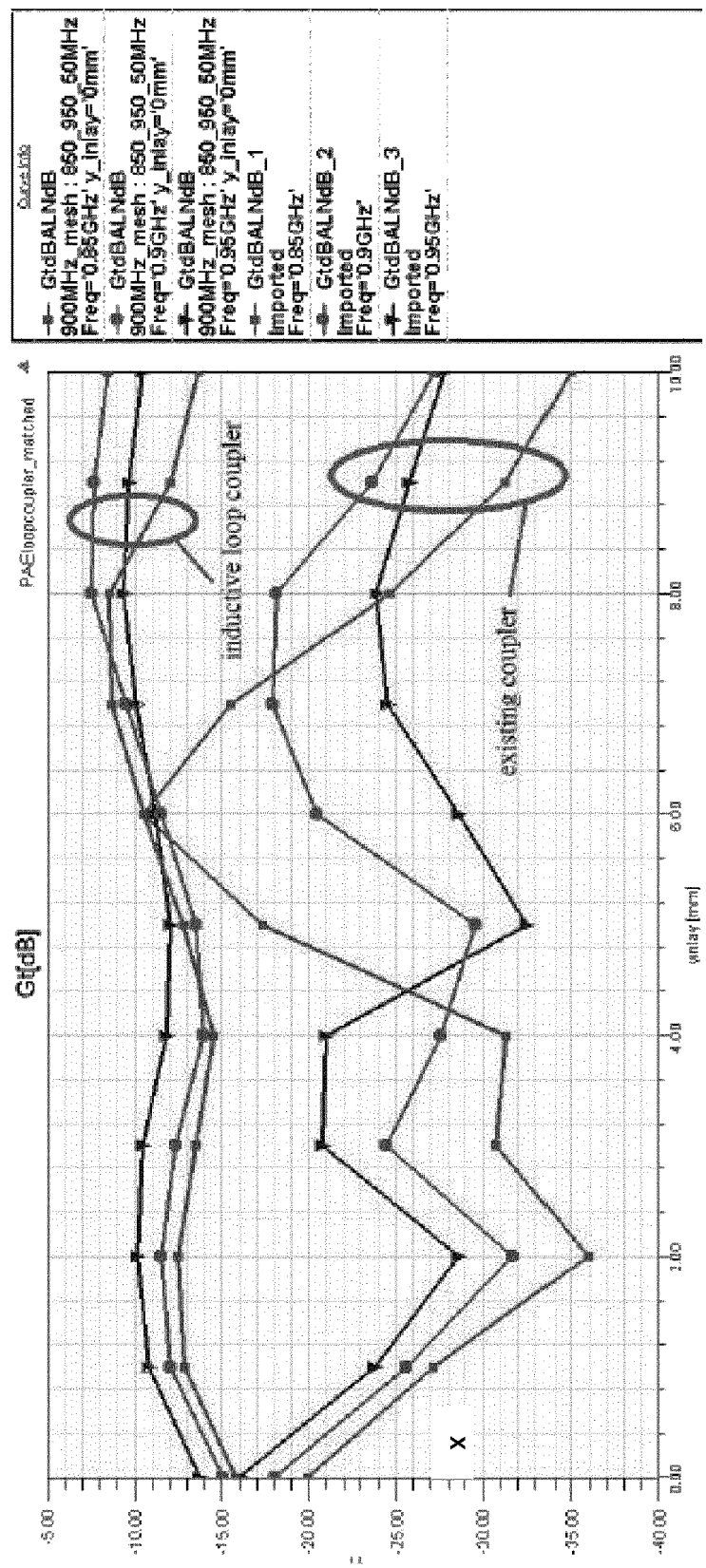
FIG. 5 is a graphical representation of a simulated comparison of the coupling gain of an inductive loop coupler such as is illustrated in FIG. 4, and a conventional static coupler.

FIG. 5 shows a graphical representation of the strength of interaction between an inlay and the loop of an inductive loop coupler as shown in FIG. 4, compared to the case of a conventional static coupler. More specifically, in FIG. 5 the transducer gain ($G_t$) is plotted as a function of distance (y-coordinate of FIG. 4) and frequency in a free space environment. This quantity also takes into account the mismatch at the ports. The parameter $y_{inlay}$ labelling the abscissa corresponds to the direction of motion of the inlay over the coupler structure, i.e. to the y-axis in FIG. 4. For both the conventional coupler and the inductive loop coupler according to the invention, simulation of coupling is provided for frequencies of 850, 900 and 950 MHz (Megahertz). As can be generally seen from this figure, the inductive loop coupler achieves a generally higher gain which has, moreover, a nearly constant distribution along the y-axis (while the static coupler exhibits strong peaks, which leads to the need for knowledge of inlay geometry and calibration, as explained in the introductory portion of the application).

It is moreover noted that in case of employing the inductor as the coupling component, there is a mutual interaction so that the value of the L component depends on the degree of coupling between a part of an RFID inlay and the distributed inductive loop. The coupling component can therefore, in principle, be additionally employed as a sensing element in a regulatory circuit for activating or deactivating certain regions of the surface of the coupler, in order to enable performing isolated encoding of inlays in a neighbouring environment. Such a regulatory circuit would control the main signal path in the entire coupler by RF (radio frequency) devices such as PIN-diodes, RF-switches, etc. This would mean that distribution of electromagnetic leakage fields from the coupling structure may be further enhanced in a self regulatory manner.

As mentioned above, the phase compensating element described in detail above with reference to FIGS. 3 to 5 represents a coupling structure with a one-dimensional geometry. This means that the arrangement of elements so as to build up the entire coupler extends only in one direction. However, the example can be extended to a two-dimensional array structure as well, which would mean that the PC element in FIG. 3 would become a two-port.

The present invention has the fundamental advantage that it eliminates both the dependence of the coupler arrangement on inlay geometries and the calibration process. At the same time isolated communication toward inlays in continuous media regardless of pitch is achieved. In extension the efficient coupling will also keep outside radiation levels to a minimum which is a crucial parameter in the radio approval process of today. The coupler arrangement according to the present invention is an independent component rather relying on physical principles then on software control and algorithms. Thus, the electromagnetic coupler arrangement of the present invention is independent of the complete system to which it belongs (such as a printer/encoder device) and can be used in any environment where isolated communication towards inlays in reactive near field is needed.

The basic principle underlying the present invention is to transform a standard guided wave input signal (such as in a 50Ω system) into a distributed field without any wave phenomena (propagation) so that coupling purely due to a time alternating field is exhibited. The distribution of this field over the top surface will yield the orientation and geometry independent coupling, where the integration of all contributions from the elements underneath the metal trace yields the transfer of power to some receiver or transceiver connected to the trace. In other words, the present invention eliminates the wavelength dependency of the coupling configuration (which conventionally leads to a phase shift across the coupler structure) and the result is a static coupler behavior per unit cell.

Since the inlay is a far field tuned device for propagation at large distances (or at least for the radiating near field), one further goal of the present invention is to eliminate this property and instead couple energy and information to the transponder in reactive near field. Consequently, the inlay is not regarded as a far field radiating device any longer but rather as component in a single transfer chain. Thereby, destructive cavity interference due to radiation and RF isolation problems with neighbors adjacent to the inlay to be encoded are prevented, which are strict requirements in an RFID enabled printer.

In summary, the present invention relates to an adaptive near field electromagnetic coupler for coupling electromagnetic power to a plane metallic trace (inlay) independently of the inlay geometry and/or orientation without external control algorithms. This is achieved by employing a microstructure of phase altering elements suitable of creating a constant phase field distribution along a top surface of the coupler structure. The present invention is particular advantageously applicable to printing devices having a function of encoding RFID layers printed on a medium. In view of the provided flexibility, the coupler arrangement of the invention can be employed in a variety of printers of different mechanical design.

The invention claimed is:

1. A multi-layer electromagnetic coupler arrangement for coupling electromagnetic power to a planar metallic trace of arbitrary geometric shape, the electromagnetic coupler arrangement comprising:
   a top surface layer forming a top surface of the electromagnetic coupler arrangement, said top surface layer being arranged closest to said metallic trace to which the electromagnetic power is to be coupled;
   a dielectric layer having a surface covered by said top surface layer;
   an input signal source layer for providing an AC electromagnetic input field signal; and
   a one- or a two-dimensional array of phase altering elements sized and mutually arranged such as to provide phase compensation for a spatial change of position between each of said phase altering elements and a neighboring said phase altering element for transforming said input field signal into a distributed electromagnetic field with substantially constant phase across said top surface;
   wherein said one- or two-dimensional array of phase altering elements is provided between said input signal source layer and said dielectric layer;
   said input signal source layer provides a guided wave input signal having a target wavelength, the target wavelength being a wavelength of propagation in a homogeneous dielectric of the material of said dielectric layer; and
   a size of each of said phase altering elements is significantly smaller than one half of the target wavelength.

2. A multi-layer electromagnetic coupler arrangement according to claim 1, wherein said top surface layer comprises a metallic material with at least one of apertures and a microstructure.

3. A multi-layer electromagnetic coupler arrangement according to claim 2, wherein at least one of a size of said microstructure and dimensions and distances between said apertures is substantially smaller than said guided wavelength of said electromagnetic field in said dielectric layer.

4. A multi-layer electromagnetic coupler arrangement according to claim 1, wherein said one- or two-dimensional array of phase altering elements comprises a transmission line network.

5. A multi-layer electromagnetic coupler arrangement according to claim 4,
   wherein said transmission line network comprises plural transmission line layers, and
   wherein the coupler arrangement further comprises dielectric layers positioned between said transmission line layers, and between a transmission line layer that is most distant from said top surface and said input signal source layer.

6. A multi-layer electromagnetic coupler arrangement according to claim 1, wherein said one- or two-dimensional array of phase altering elements comprises a metallic layer with apertures, said metallic layer being arranged between said dielectric layer and said input signal source layer.

7. A multi-layer electromagnetic coupler arrangement according to claim 6, further comprising a further dielectric layer between said metallic layer with said apertures and said input signal source layer.

8. A multi-layer electromagnetic coupler arrangement according to claim 1, comprising a further dielectric and a further metallic layer arranged as a ground plane layer on a side of said input signal source layer opposing said one- or two-dimensional array of phase altering elements,
wherein said ground plane layer thereby forms a bottom layer of the entire said multi-layer electromagnetic coupler arrangement on a side opposing said top surface layer.

9. A multi-layer electromagnetic coupler arrangement according to claim 1, wherein said input signal source layer comprises a strip transmission line.

10. A multi-layer electromagnetic coupler arrangement according to claim 1, wherein said input signal is a standard guided wave input signal provided by a 50Ω coaxial cable system.

11. A multi-layer electromagnetic coupler arrangement according to claim 1, wherein each of said phase altering elements forms, together with a transmission line segment having a predetermined electrical length, a phase compensated element and includes a network of lumped or distributed components for achieving phase compensation for the predetermined electrical length of said transmission line segment.

12. A multi-layer electromagnetic coupler arrangement according to claim 11, wherein said components comprise an inductive component and at least one capacitive component.

13. A multi-layer electromagnetic coupler arrangement according to claim 12, wherein said inductive components of said phase altering elements are realized in distributed form as inductive loops,
wherein said loops are disposed on one side of a three layer printed circuit board, and said transmission layer segments are disposed on the opposite side, and said intermediate layer of said printed circuit board acts as a ground plane.

14. A multi-layer electromagnetic coupler arrangement according to claim 12, wherein said inductive components of said phase altering elements are realized in distributed form as inductive loops,
wherein said planar metallic trace is part of an RFID inlay, and said inductive loops are adapted to be used for reactive near field coupling towards said RFID inlay.

15. A multi-layer electromagnetic coupler arrangement according to claim 11, wherein said planar metallic trace is part of an RFID inlay, and said transmission line segments are adapted to be used for reactive near field coupling towards said RFID inlay.

16. A multi-layer electromagnetic coupler arrangement according to claim 1, wherein said planar metallic trace is part of an RFID inlay, and said multi-layer electromagnetic coupler arrangement is adapted to encode said RFID inlay by coupling electromagnetic power thereto.

17. A multi-layer electromagnetic coupler arrangement according to claim 1, configured for being employed in a printer wherein said RFID inlays to be encoded are arranged on a medium guided in the printer along a media path,
wherein a shape of said multi-layer electromagnetic coupler arrangement can be flexibly adapted so as to achieve a constant distance between said top surface and said media path of said printer at all positions of said top surface.

18. An RFID printer/encoder comprising a multi-layer electromagnetic coupler arrangement according to claim 1.

19. An RFID printer/encoder according to claim 18, wherein electromagnetic coupling for transferring coding information to an RFID inlay occurs in the reactive near field.

* * * * *